US006763167B2

(12) United States Patent
Gaudiana et al.

(10) Patent No.: US 6,763,167 B2
(45) Date of Patent: Jul. 13, 2004

(54) INTEGRAL ORGANIC LIGHT EMITTING DIODE FIBER OPTIC PRINTHEAD

(75) Inventors: Russell A. Gaudiana, Merrimack, NH (US); Richard G. Egan, Dover, MA (US); Bennett H. Rockney, Westford, MA (US); Joseph DelPico, Brockton, MA (US)

(73) Assignee: Polaroid Corporation, Waltham, MA (US)

( * ) Notice: Subject to any disclaimer, the term of this patent is extended or adjusted under 35 U.S.C. 154(b) by 477 days.

(21) Appl. No.: 09/742,246

(22) Filed: Dec. 20, 2000

(65) Prior Publication Data

US 2002/0114596 A1 Aug. 22, 2002

(51) Int. Cl.[7] .................................................. G02B 6/04
(52) U.S. Cl. ...................................................... 385/120
(58) Field of Search .......................... 385/120; 257/40; 313/504, 506

(56) References Cited

U.S. PATENT DOCUMENTS

| | | | | |
|---|---|---|---|---|
| 4,447,126 A | | 5/1984 | Heidrich et al. | 350/96.31 |
| 4,715,682 A | | 12/1987 | Koek et al. | 350/253 |
| 4,921,316 A | * | 5/1990 | Fantone et al. | 385/120 |
| 5,424,560 A | * | 6/1995 | Norman et al. | 257/40 |
| 5,920,080 A | | 7/1999 | Jones | 257/40 |
| 5,929,474 A | | 7/1999 | Huang et al. | 257/292 |
| 5,952,789 A | | 9/1999 | Stewart et al. | 315/169.4 |
| 6,016,033 A | * | 1/2000 | Jones et al. | 313/504 |
| 6,064,418 A | | 5/2000 | Shimizu et al. | 347/238 |
| 6,069,443 A | | 5/2000 | Jones et al. | 313/504 |
| 6,140,766 A | * | 10/2000 | Okada et al. | 313/504 |
| 6,191,433 B1 | * | 2/2001 | Roitman et al. | 257/40 |

FOREIGN PATENT DOCUMENTS

| | | | |
|---|---|---|---|
| EP | 0 734 078 A2 | 3/1996 | H01L/33/00 |
| JP | 2000345752 | 12/2000 | |

OTHER PUBLICATIONS

S. Forrest, et al., The Dawn of Organic Electronics, IEEE Spec., vol. 37, No. 8, pp. 29–34, Aug. 2000.

Y. Tsuruoka, et al., 40.2: Application of Organic Electroluminescent Device To Color Print; 2000, SID 00 Digest; pp. 978–981.

WIPO Publication, WO 99/36261.

K. Inukai, et al., 36–4L: Late–News Paper: 4.0–in. TFT–OLED Displays and a Novel Digital Driving Method; pp. 924–927, 2000 SID 2000 Digest.

WIPO Publication, WO 99/20081.

WIPO Publication, WO 98/06122.

WIPO Publication, WO 99/39393.

* cited by examiner

*Primary Examiner*—Lynn Feild
*Assistant Examiner*—Brian S. Webb

(57) ABSTRACT

A compact light weight printhead capable of direct quasi-contact printing includes an OLED structure disposed on a fiber optic faceplate substrate. The printhead is designed for contact or quasi-contact printing printing. The printhead design ensures that the desired pixel sharpness and reduced crosstalk is achieved. Two possible different arrangements for the printhead are disclosed. One arrangement includes at least one array of OLED elements. Each OLED array in this arrangement includes at least one triplet of OLED elements, and each element in each the triplet is capable of emitting radiation in a distinct wavelength range different from the distinct wavelength range of the other two color filters in the same triplet. In the second arrangement, the printhead includes at least one triplet of arrays of individually addressable Organic Light Emitting Diode (OLED) elements. In this second arrangement, each OLED array in each triplet has elements that are capable of emitting radiation in a distinct wavelength range different from the distinct wavelength range of the other two arrays in the triplet.

18 Claims, 9 Drawing Sheets

INTEGRAL ORGANIC LIGHT EMITTING DIODE FIBER OPTIC PRINTHEAD

BACKGROUND OF THE INVENTION

1. Field of the Invention

This invention relates generally to compact, light weight printheads and, more particularly, to integral Organic Light Emitting Diode (OLED) fiber optic printheads.

2. Background

Light emitting diodes (LED) have been used for exposing photosensitive materials such as photographic film or photographic paper or photocopying receptors. The light emitting diodes are usually arranged in a linear array or a number of linear arrays and means are provided for a relative displacement of the photosensitive materials in relation to the array. In this manner, the material is scanned past the array and an area is exposed thereby creating an image.

The light emitted from LEDs diverges quickly and thus reduces the exposing intensity and increases the exposing area. This can lead to a reduction in sharpness of the exposed image and to the possibility of undesired exposure of adjacent areas. The first of these problems is known as reduced pixel sharpness and the second is known as crosstalk. To avoid these difficulties, optical systems are utilized to transmit the light from the LEDs to the photosensitive material without significant divergence. While this approach results in an acceptable printing system, such systems have their size defined by the optical systems and therefore are not as compact as would be desired for a portable print system.

Organic Light Emitting Diodes (OLED), which have been recently developed, (See, for example, the article by S. Forrest, P. Burrows, and M. Thompson, "*The dawn of organic electronics*", IEEE Spectrum, Vol. 37, No, 8, pp. 29–34. August 2000) hold a promise of ease of fabrication and low cost and low power consumption. A recent publication (Y. Tsuruoka et. al., "Application of Organic electroluminescent Device to Color Print Head", SID 2000 Digest, pp. 978–981), describes a print head utilizing OLEDs. The printhead described in this publication is comprised of discrete OLEDs, color filters and optical elements and therefore is not as compact as desired. Also, the presence of discrete optical elements requires considerations of alignment which have an impact on manufacturability and cost.

While it would be preferable to dispense with the use of optical elements (see related applications Ser. No. 09/749,346 filed on Dec. 27, 2000 and Ser. No. 09/745,042 filed on Dec. 20, 2000), there are some cases of interest where obtaining the best printing conditions requires using optical elements. Among the proposed optical elements that have been proposed by others are arrays of graded index lenses and arrays of graded index optical fibers. Both of these proposed solution (see for example, U.S. Pat. No. 4,447,126, entitled "Uniformly Intense Imaging by Close Packed Lens Array", by P. Heidrich et al, and U.S. Pat. No. 4,715,682, entitled "Mount for Imaging Lens Array on Optical Printhead", by K. Koek et al.) require considerations of alignment and assembly. An Integral Fiber Optic printhead which utilizes electrical connection means to connect the light emitting diodes to conductive lines on the substrate has been described in U.S. Pat. No. 4,921,316 (Fantone et al., *Integral Fiber Optic Printhead*). The light emitting diodes used in present printers (see for example, Shimizu et al., *LED Arrays, Print Head, and Electrophotographic Printer,* U.S. Pat. No. 6,064,418, May 16, 2000) emit radiation from the surface of a p-n junction (constitute edge emitters) and are typically mounted on a printed circuit board. These characteristics of the LEDs used in previous printers impose constraints on manufacturability and the ability to optimize performance.

It is the primary object of this invention to provide an integral printhead which is compact, light weight, requires minimal alignment and utilizes Organic Light Emitting Diodes (OLED). It is a further object of this invention to provide an integral printhead which provides the necessary pixel sharpness while avoiding crosstalk and which utilizes Organic Light Emitting Diodes (OLED). Other objects of this invention will become apparent hereinafter.

SUMMARY

To provide a printhead that is light weight and compact, which is the primary object of this invention, an OLED structure is disposed onto a fiber optic faceplate substrate. The fiber optic faceplate substrate has a substantially planar light receiving surface oppositely spaced apart with respect to a substantially planar light emitting surface. The fiber optic faceplate comprises a plurality of individual glass fibers which are stacked together, pressed and heated under pressure to form a uniform structure with a plurality of light transmitting passages extending between the light receiving and light emitting surfaces. The OLED structure is placed on the light receiving surface of the fiber optic faceplate substrate. The OLEDs emit radiation in one of at least three separate wavelength ranges. To provide an integral printhead that provides the necessary pixel sharpness while avoiding crosstalk, the printhead is designed for direct printing with the desired pixel sharpness and reduced crosstalk.

In one embodiment, the OLED structure comprises at least one elongated array of individually addressable Organic Light Emitting Diode (OLED) elements deposited onto the fiber optic faceplate substrate. Two possible different arrangements for the printhead are disclosed. In one arrangement, each OLED array in the printhead comprises at least one of a plurality of triplets of OLED elements, and each element in each said triplet being capable of emitting radiation in a distinct wavelength range different from the distinct wavelength range of the other elements in the same triplet. In the second arrangement, the printhead comprises at least one of a plurality of triplets of elongated arrays of individually addressable Organic Light Emitting Diode (OLED) elements. Each array in the triplet is aligned in substantially parallel relation to any other array in the triplet. Each array in each triplet has elements that are capable of emitting radiation in a distinct wavelength range different from the distinct wavelength range of the other two arrays in the triplet.

In second embodiment, the OLED structure comprises a substrate having a planar first surface opposite to a planar second surface and at least one elongated array of individually addressable Organic Light Emitting Diode (OLED) elements, the at least one array of OLED elements being disposed on the second surface of the OLED structure substrate. A substantially transparent layer is deposited onto the at least one elongated array of individually addressable Organic Light Emitting Diode (OLED) elements. The substantially transparent layer has a light receiving surface in effective light transmission relation to the OLED elements, the light receiving surface being located opposite to a light emitting surface. The OLED structure is disposed on and mechanically coupled to fiber optic faceplate. Again, the same two alternative arrangements previously disclosed are applicable for this embodiment.

The parameters including the distance between OLED elements, the characteristic dimension of the OLED elements, the distance between the light emitting surface of the fiber optic faceplate substrate and the photosensitive material, the numerical aperture of the optical fibers, are selected to optimize the exposure of the photosensitive material at a given pixel area corresponding to a given OLED element, due to the light intensity from the elements of the array which are adjacent to the given OLED element and from the given OLED element. An exposure is optimized if the Subjective Quality Factor (SQF) of the resulting pixel is as close to 100 as possible and if the intersection of the normalized intensity profile produced by an adjacent color filter array element at given pixel locations with the normalized intensity profile produced by the corresponding color filter array element is as close to 0.5 as possible.

The printheads of this invention can be used to expose the entire gamut of photosensitive materials, for example, silver halide film, photosensitive paper, dry silver, photocopyng receptor material, imageable materials comprised of dyes, acid amplifiers and other photosensitive compounds.

These embodiments provide printheads that are light weight and compact, where an OLED structure is disposed on a fiber optic faceplate substrate. The printheads are designed for direct quasi-contact printing with the desired pixel sharpness and reduced crosstalk. By virtue of their compactness and their light weight, as well as the low power requirements of OLED elements, the printheads of this invention enable the construction of portable printing devices for the mobile data environment.

DESCRIPTION OF THE DRAWINGS

The novel features of this invention are set forth in the appended claims. However, the invention will be best understood from the following detailed description when read in connection with the accompanying drawings wherein:

DETAILED DESCRIPTION

To provide a printhead that is light weight and compact, which is the primary object of this invention, an OLED structure is deposited onto a substrate and the printhead is designed for direct printing with the desired pixel sharpness and reduced crosstalk. In order to achieve this objective, radiation in at least three separate wavelength ranges must be delivered to the medium. In some cases, physical constraints do not permit obtaining the desired pixel sharpness and reducing crosstalk while direct printing without optical elements. In those cases, a fiber optic faceplate substrate provides an optical component that allows for ease of assembly and results in a compact printhead.

An Integral Fiber optic printhead which utilizes electrical connection means to connect the light emitting diodes to conductive lines on the substrate has been described in U.S. Pat. No. 4,921,316 (Fantone et al., *Integral Fiber Optic Printhead*), which is hereby included by reference. The light emitting diodes used in present printers (see for example, Shimizu et al., *LED Arrays, Print Head, and Electrophotographic Printer*, U.S. Pat. No. 6,064,418, May 16, 2000) emit radiation from the surface of a p-n junction (constitute edge emitters) and are typically mounted on a printed circuit board. The differences between these LEDs and the OLED of this invention will be apparent from the description that follows. Due to these differences, the LEDs used in previous printers impose constraints on manufacturability and ability to optimize performance.

The present invention utilizes OLEDs to eliminate alignment and to integrate the assembly. A type of embodiments of printheads utilizing OLEDs and a fiber optic faceplate that achieve the stated objective are disclosed in this application. A second type of embodiments is disclosed in related U.S. Pat. No. 6,525,758, issued on Feb. 25, 2003 by Gaudiana et al and entitled Integral Organic Light Emitting Diode Fiber Optic Printhead Utilizing Color Filters. In the type of embodiments disclosed in this application, an OLED structure comprising OLEDs emitting radiation into at least three separate wavelength ranges is disposed onto the fiber optic faceplate.

Two embodiments of an OLED structure disposed onto a fiber optic faceplate are presented below. In the first embodiment, the OLED structure is deposited onto the fiber optic faceplate. In the second embodiment, the OLED structure is mechanically attached to the fiber optic faceplate.

OLED Structure Deposited Onto The Fiber Optic Faceplate

Figure 1B:
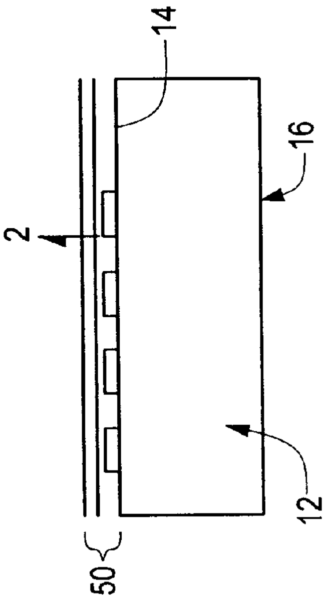
FIG. 1B is a side view of the graphical representation of FIG. 1A and indicates the view used for FIG. 2.
Figure 1A:
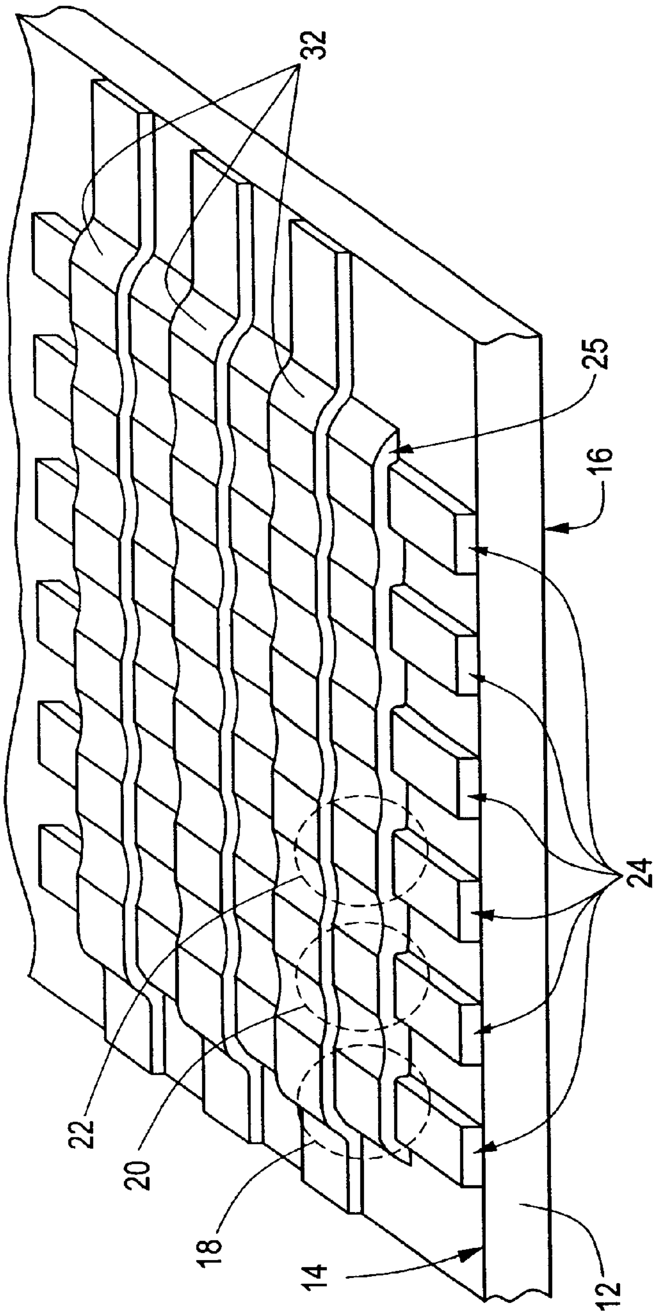
FIG. 1A depicts a graphical representation of the first embodiment of an OLED printhead and illustrates the components of a passively addressable OLED structure.

Referring to FIGS. 1–3, a printhead assembly of one embodiment of this invention is shown at 10. As shown in FIG. 1, an elongated coherent fiber optic faceplate substrate 12 having a substantially planar light receiving surface 14 oppositely spaced apart with respect to a substantially planar light emitting surface 16 serves as a base on which to deposit the Organic Light Emitting Diode (OLED) structure 50, comprising OLED arrays 18, 20 and 22. The fiber optic faceplate comprises a plurality of individual glass fibers which are stacked together, pressed and heated under pressure to form a uniform structure with a plurality of light transmitting passages extending between the light receiving and light emitting surfaces 14 and 16. The fiber optic faceplate substrate could comprise only a fiber optic faceplate or could, as well, comprise a fiber optic faceplate embedded in a glass substrate. The OLED structure 50, comprising arrays 18, 20 and 22 of individually addressable Organic Light Emitting Diode (OLED) elements is deposited onto and in effective light transmission relation to the light receiving surface 14 of the substrate 12.

Alignment between the OLED elements and the individual glass fibers is not necessary since the characteristic dimension of the OLED element is much larger than the characteristic dimension of a glass fiber and, therefore, one OLED element illuminates several fibers. In one embodiment, the OLED structure consists of transparent anode columns 24, organic layers 25 and cathode rows 32. The anode rows and cathode columns can, in one embodiment, be extended beyond the OLED structure in order to constitute conductive or electrical lines. In that embodiment, the driver control circuits 46 and 48 for selectively controlling the energizing of said Organic Light Emitting Diode (OLED) elements are connected to the row and column electrodes by electrical connection means such as elastomer connectors (sometimes called "zebra links"; commercial examples are L type connectors from Potent Technology Inc. and "G" type connectors from ARC USA/GoodTronic Corporation). Other electrical connection means for selective connection of the individually addressable light emitting elements to the driver circuits are conductive interconnecting lines. The conductive interconnecting lines can be selectively deposited on the light receiving surface of the substrate in a manner whereby they provide connecting means. If conductive interconnecting lines are used, the driver control circuits 46 and 48 are connected by means, such as wire bonding or solder bumping, to selected ones of the conductive interconnecting lines. (The driver control circuits could be mounted on the light receiving surface of the substrate 14, or could be located elsewhere if mounted elsewhere the connection means will also include electrical leads and connectors as is well known to those schooled in the art.) The conductive interconnecting lines can be connected to the individually addressable OLED elements either by means of the deposition process or by wire bonding or solder bumping. It should also be apparent to those skilled in the art that it is possible to extend and position the electrodes from the rows and columns to constitute the conductive interconnecting lines.

Figure 2A:
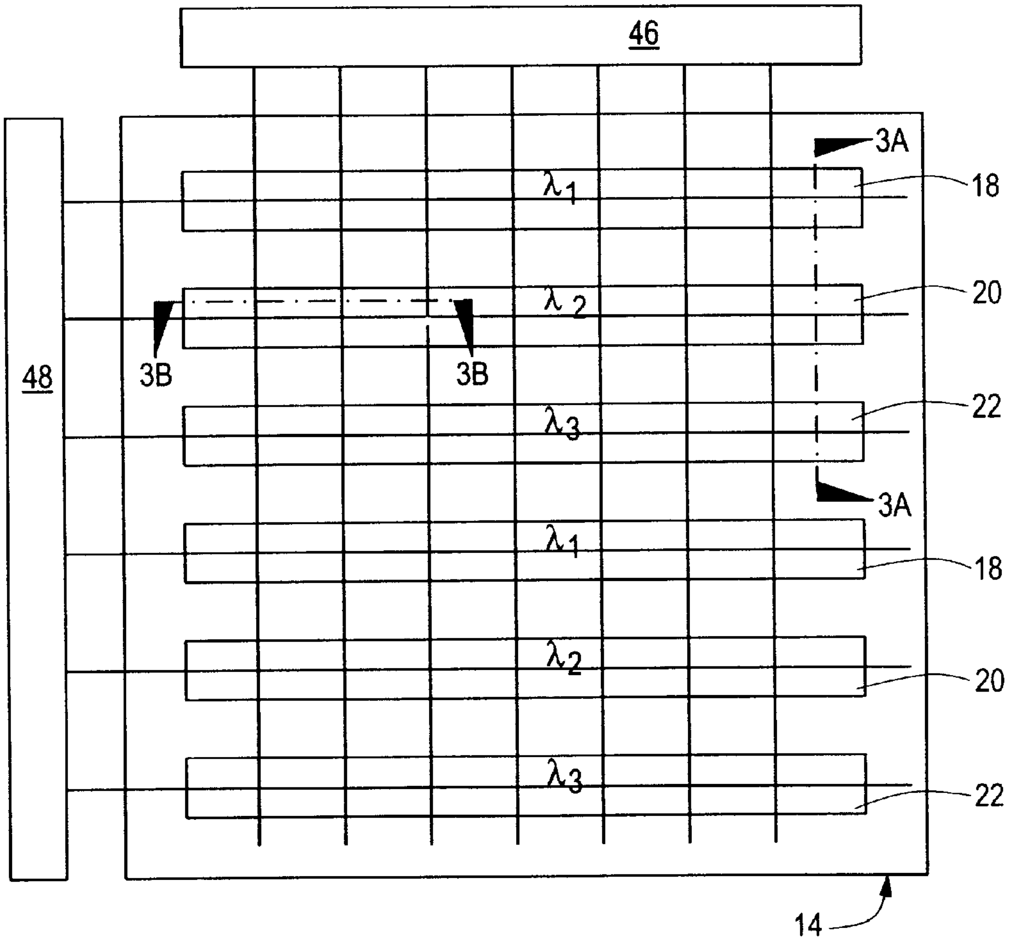
FIG. 2A is a plan view of the first embodiment of an OLED printhead where the printhead comprises a plurality of triplets of arrays where each array in the triplet emits radiation in a distinct range of wavelengths.

Referring to FIG. 2A, at least one triplet (three) of said elongated arrays of individually addressable Organic Light Emitting Diode (OLED) elements 18, 20 and 22 is deposited on the fiber optic faceplate substrate 12, the arrays in the triplet being aligned in substantially parallel spaced relation with respect to each other, each array in the triplet being capable of emitting radiation in a distinct wavelength range different from the other two arrays, such as, for example, red, green, and blue, and each triplet is aligned in substantially parallel spaced relation with respect to every other array triplet. This printhead configuration of FIG. 2A, when it comprises only one triplet of arrays, would enable the exposing of a photosensitive material one line at a time. When the configuration shown in FIG. 2A comprises many triplets of arrays, it would enable exposing an area.

The OLED is energized when a voltage is placed across the anode and cathode terminals. In analogy to liquid crystal displays, it is possible to construct both actively addressable and passively addressable OLEDs. In an actively addressable OLED structure, there is additional circuitry that allows selecting an element in the structure. The driver control circuits 46 and 48 for selectively controlling the energizing of said Organic Light Emitting Diode (OLED) elements are connected to the row and column electrodes. The driver control circuits 46 connected to the column electrodes of OLED arrays are located in the direction parallel to the arrays. The driver control circuits 48 connected to the row electrodes of OLED arrays are located in the direction perpendicular to the arrays.

Figure 3A:
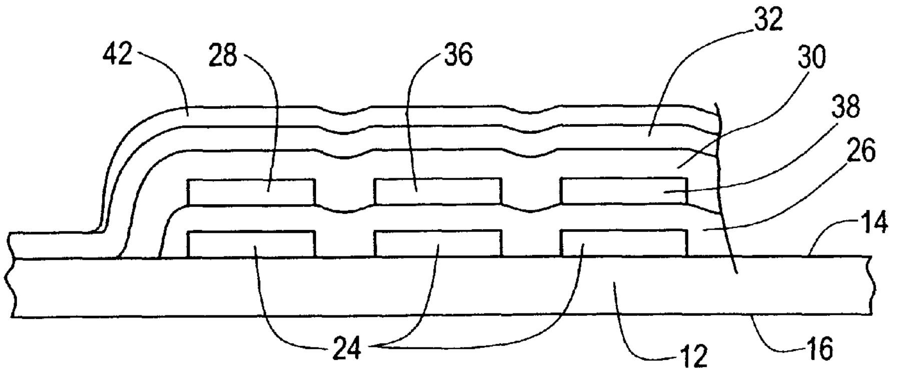
FIG. 3A is a cross-sectional view, for passively addressable OLED structure, across three arrays in the triplet of FIG. 2A and illustrates the components of a passively addressable OLED structure.
Figure 3B:
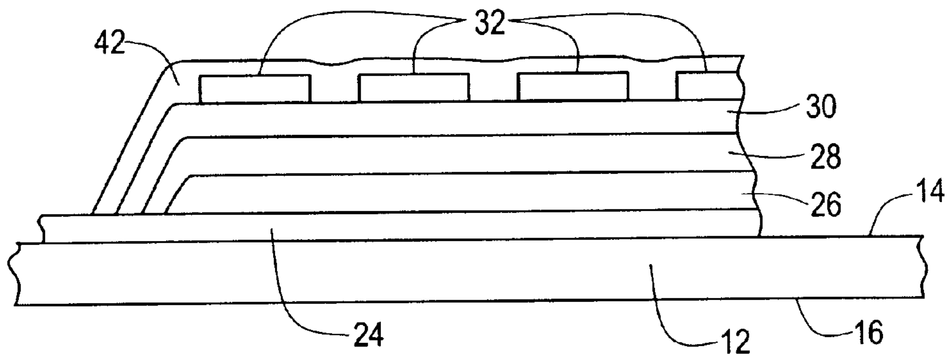
FIG. 3B is a cross-sectional view, for passively addressable OLED structure, along the array of FIG. 2A and further illustrates the components of a passively addressable OLED structure.

A cross sectional view across the three OLED arrays, the structure of FIG. 2A, depicting one element in each array, is shown in FIGS. 3A and 3B, illustrating the case of passively addressable OLEDs. Each OLED element starts with a patterned transparent conducting layer 24 which serves as an anode. Such layer consists of a material such as indium tin oxide which is a transparent conductor, or a combination of a layer of high refractive index material, a conductive layer, and another high index layer (for example, ITO, silver or silver/gold, and ITO as described in WTO publication WO 99/36261), and is deposited by vacuum deposition techniques such as sputtering or evaporation. In order to create the row pattern, techniques well known to those skilled in the art, such as photoresist and etching techniques and laser ablation, are used to remove the excess material. The organic layers are deposited next.

Deposition techniques for the organic layer range from those used for organic polymer or dyes, such as coating, spin coating and innovative mass transfer techniques to the standard vacuum deposition techniques, such as sputtering or evaporation and also including ink jet printing and thermal transfer. At least two organic layers are used in each array although three layer structures are most common. First, a hole transport layer 26 is deposited (the hole transport layer is common to the arrays emitting in all three wavelength ranges). Then, an electroluminescent layer is deposited for each array (one layer 28 for the array emitting at the first wavelength range, another 36 for the array emitting at the second wavelength range, and another 38 for the array emitting at the third wavelength range). An electron transport layer 30, which is common to the arrays emitting at all three wavelengths, is then deposited. (It is possible to combine the electroluminescent layer and the electron transport layer into one layer. In this case, that layer is different for every wavelength and layer 30 is absent.) A cathode structure 32 is deposited next using vacuum deposition techniques. For a passive addressing OLED printhead the cathode structure is a conductive material structure such as a magnesium silver alloy layer and silver layer or metals such as silver, gold, aluminum, copper, magnesium or a combination thereof. The conductive material 32 in FIG. 3A forms a column electrode. For an active addressing OLED printhead a structure consisting of a conductive material and a transistor switch (or two transistors and a capacitor) at each element is required. Finally, a protective coating 42 is deposited by any of a variety of means (similar to the organic layers).

A cross-sectional view along the array, for the case of passively addressable OLEDs and the structure of FIG. 2A, is shown in FIG. 3B. The organic layers 26, 28 and 30 and the anode now extend along the array and the anode 24 constitutes a row electrode.

Exposing a photosensitive material with the printhead of FIG. 2A occurs in the following manner. The printhead is placed over the photosensitive material such that the planar light emitting surface of the substrate is oppositely spaced apart at a given distance from and substantively parallel to the light receiving surface of the photosensitive material. In the passive addressing mode as would be the case for printing on highly sensitive instant silver halide film, one row at a time is addressed and printed before multiplexing to the next row. At the completion of addressing and printing all the rows that emit in one wavelength range (red, for example), the OLED print engine is moved one row relative to the film plane and the addressing and printing process repeated with next wavelength range (for example, green). This movement occurs in the direction perpendicular to both the distance between the printhead and the light receiving surface of the photosensitive material. This shifting and printing operation is repeated one more time such that every image pixel in the frame can be exposed to, for example, red, green and blue light (FIG. 2A). For a line exposure, the method is the same as in the preceding discussion but the printhead has to be returned to starting location or the process must be carried in reverse order while printing the next line. The total print time, for an area exposure, is dependent on print size and is equal to the number of rows times the sum of the exposure time for each color plus the short time to move the print engine one row, twice. In the active addressing mode, where each element has a transistor switch (two transistors and a capacitor), it is possible to energize all the OLEDs at the same time. In this case the total print time is independent of print size and, for an area exposure, is equal to three times the longest exposure time plus, again, the time to move the print engine (or the film) one row, twice.

Figure 2B:
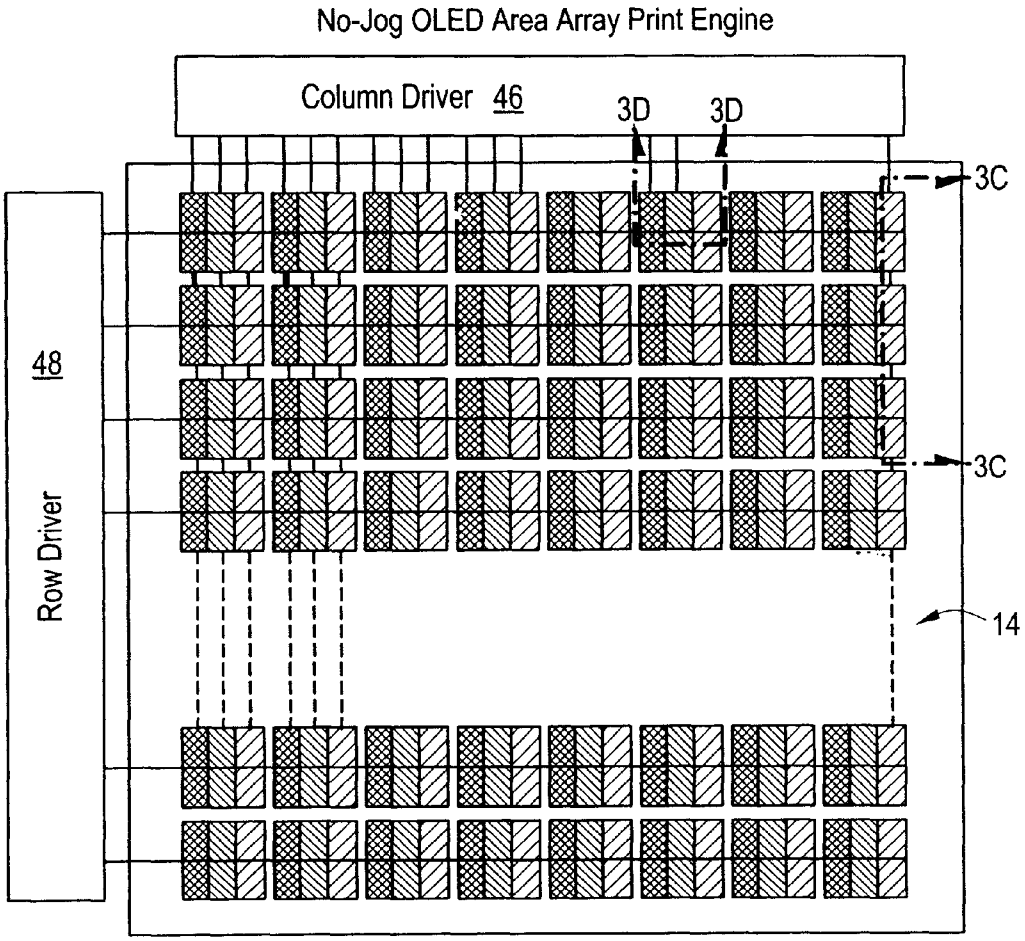
FIG. 2B is a plan view of the second embodiment of an OLED printhead where each array is comprised of a plurality of triplets of OLED elements and each element in each of the triplets emits radiation in a distinct wavelength range.
Figure 3C:
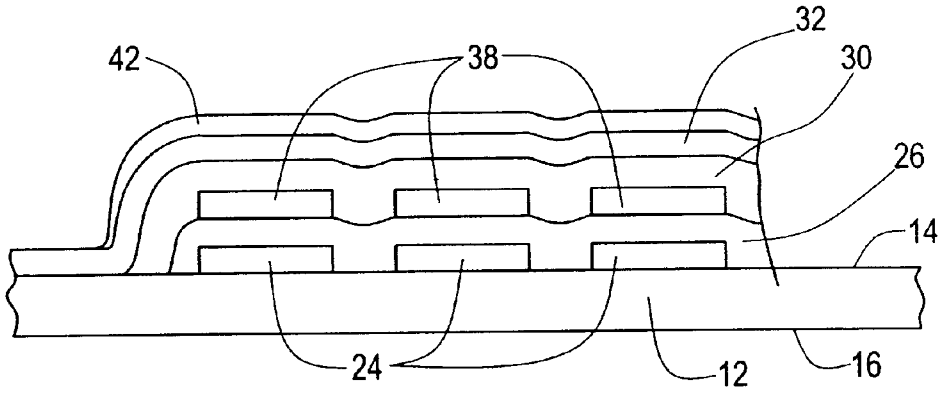
FIG. 3C is a cross-sectional view, for passively addressable OLED structure, across three arrays are FIG. 2B and illustrates the components of a passively addressable OLED structure in FIG. 2B.
Figure 3D:
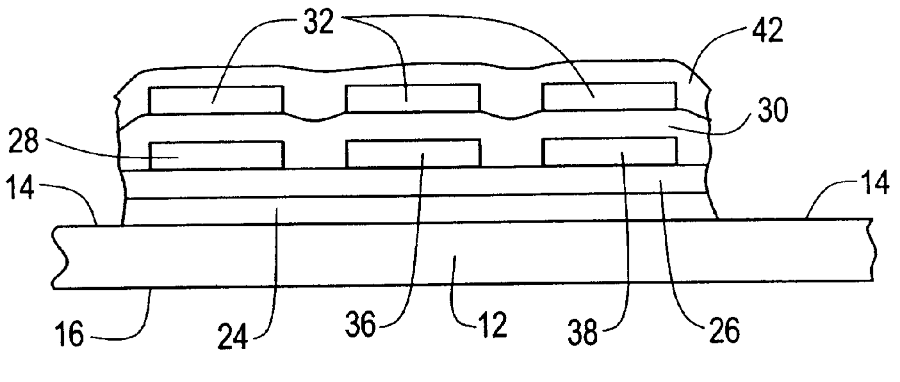
FIG. 3D is a cross-sectional view, for passively addressable OLED structures, along the array of FIG. 2B and across one triplet of OLED elements in that array.

In a second printhead arrangement, shown in FIG. 2B, each OLED array is comprised of a plurality of triplets of OLED elements, and each element in each of the triplets is capable of emitting radiation in a distinct wavelength range different from the other two elements in the same triplet.(red, green, and blue for example). The differences between this arrangement and the arrangement shown in FIG. 2A can also be seen from the cross sectional views shown in FIGS. 3C and 3D. Referring to FIG. 3C, it is similar to FIG. 3A except that all three electroluminescent layers 38 emit in the same wavelength range. Referring now to FIG. 3D, while in FIG. 3B (which is the corresponding cross section for FIG. 2A) the electroluminescent layer is continuos and emits in one wavelength range, in FIG. 3D there are three electroluminescent layers each emitting radiation in a distinct wavelength range (one layer 28 for the array emitting at the first wavelength range, another 36 for the array emitting at the second wavelength range, and another 38 for the array emitting at the third wavelength range). The printhead of FIG. 2B would not require moving one row relative to the film plane and repeating the addressing and printing process with new data. In the passive addressing mode, the total print time for the printhead of FIG. 2B, for an area exposure, is dependent on print size and is equal to the number of rows the longest exposure time for any wavelength range. In the active addressing mode, the total print time is independent of print size and, for an area exposure, is equal to the longest exposure time.

Alignment between an OLED element and the individual glass fibers is not necessary since the characteristic dimension of the OLED element is much larger than the characteristic dimension of a glass fiber and, therefore, one OLED element illuminates several fibers.

OLED Structure Coupled to the Fiber Optic Faceplate

Figure 4:
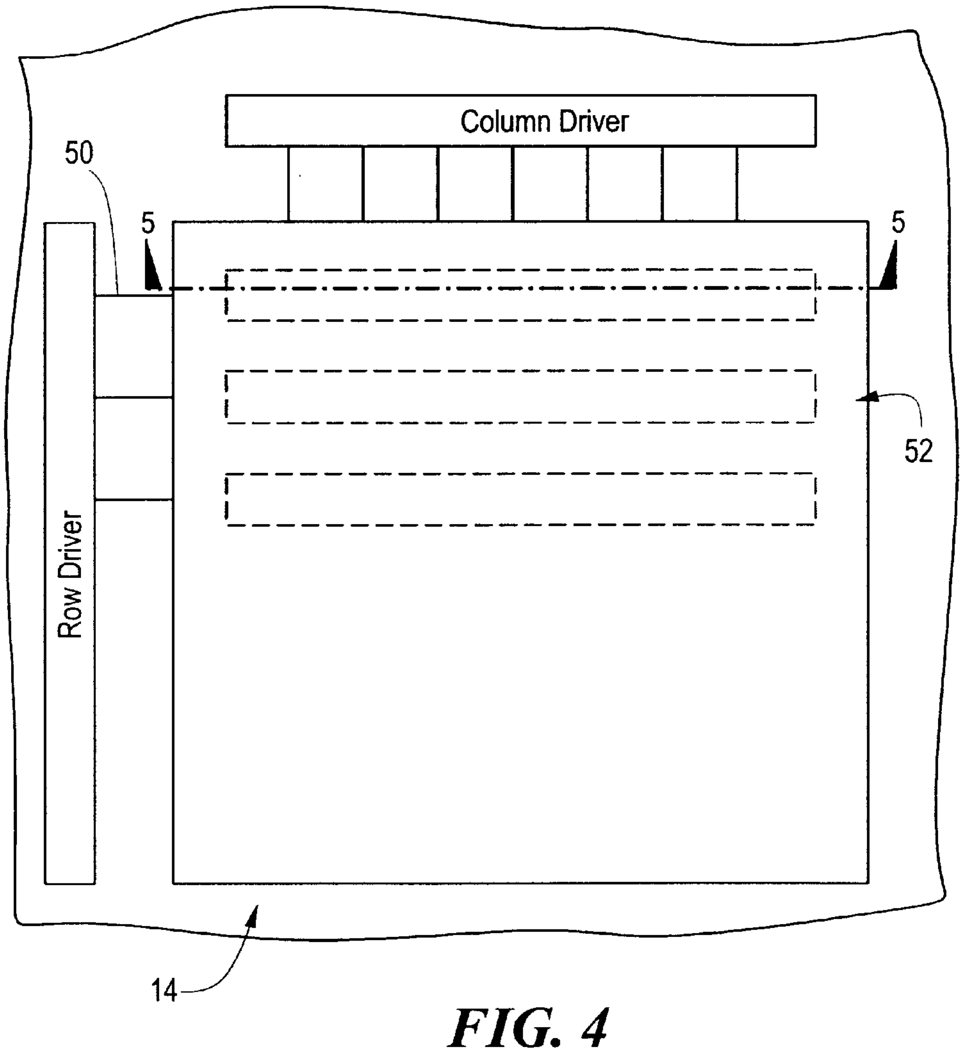
FIG. 4 is a top view of a printhead in which the OLED structure is on a separate substrate.
Figure 5:
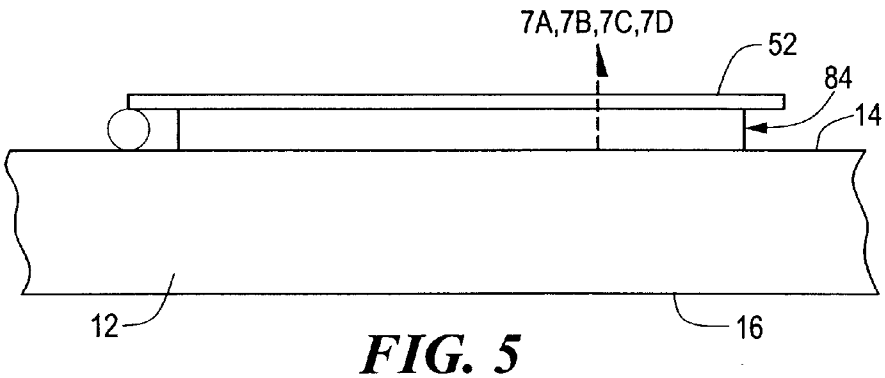
FIG. 5 is a side view of a printhead in which the OLED Structure is on a separate substrate.

In some cases of interest, it is advantageous to construct the OLED structure on a separate substrate and, then, mechanically couple it to the fiber optic faceplate. Referring to FIGS. 4–6, there is shown a printhead comprising a fiber optic faceplate substrate 12 and an OLED structure 84 on a separate substrate 52 disposed on the fiber optic faceplate substrate. The OLED structure can be a passively addressable structure or an actively addresable structure. The OLED structure is configured in one of two arrangements. In one arrangement, the view of the OLED structure from the light receiving surface of the fiber optic faceplate substrate is similar to FIG. 2A. In another arrangement of the OLED structure, the view from the light receiving surface of their fiber optic faceplate substrate is similar to that or FIG. 2B. That is, in one arrangement the printhead comprises a plurality of triplets of elongated arrays of individually addressable Organic Light Emitting Diode (OLED) elements, each array in each triplet being capable of emitting radiation in a distinct wavelength range different from the distinct wavelength range of the other two arrays in the triplet (similar to FIG. 2A). In another arrangement, the at least one array in the OLED structure is comprised of a plurality of triplets of OLED elements, each element in each the triplet being capable of emitting radiation in a distinct wavelength range different from the other two elements in the same triplet (similar to FIG. 2B). In both of the arrangements, the OLED structure comprises at least one elongated array of individually addressable Organic Light Emitting Diode (OLED) elements. Also in both of the arrangements, an OLED structure substrate 52 having a substantially planar first surface 54 oppositely spaced apart from and substantively parallel to a substantially planar second surface 56 serves a base on which to deposit the individually addressable arrays of Organic Light Emitting Diode (OLED).

Details of the structure of OLED elements are shown in FIGS. 6A, 6B, 6C and 6D. For an actively addressable OLED structure, referring to FIGS. 6A and 6C, these elements comprise a transistor switch (the transistor switch comprising a plurality of transistors and a capacitor) 58, at least one planarizing layer 60, a plurality of contact pads and electrical busses 62. Both actively addressable and passively addressable OLED structures contain a cathode 64, a plurality of layers of organic materials, and a transparent anode 24. For actively addressable OLED structures, the transistor switch 58 is deposited in the closest proximity to the first surface 54. For passively addressable OLED structures, referring to FIGS. 6B and 6D, the cathode 64 is deposited in the closest proximity to the first surface 54. For both types of structures, the transparent anode is deposited in the farthest separation from the first surface; and, a substantially transparent layer 66 is deposited onto the OLED structure. The transparent layer 66 has a light receiving surface 68 in effective light transmission relation to the transparent anode 24, the light receiving surface 68 is oppositely spaced apart from a light emitting surface 70. This structure is further defined in FIGS. 6A, 6C and FIGS. 6B and 6D.

Figure 6A:
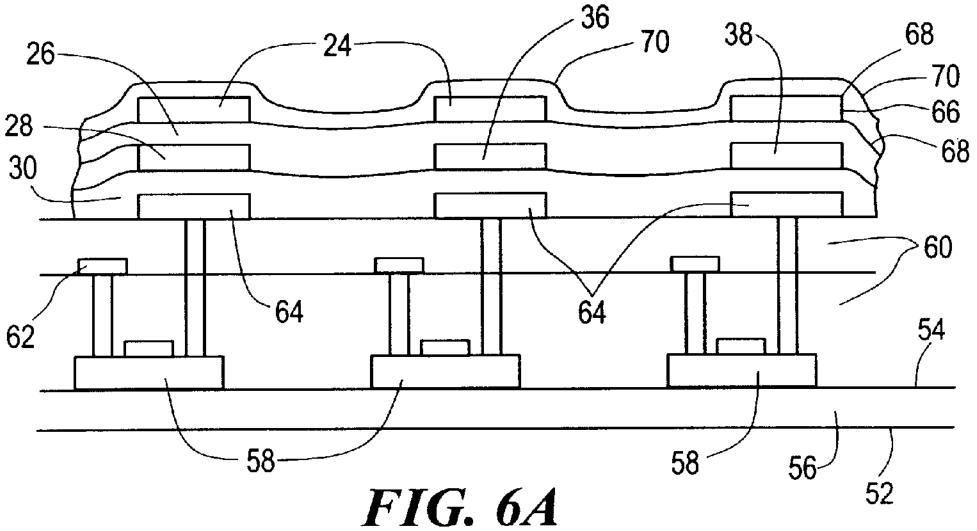
FIG. 6A is a cross-sectional view, for an actively addressable OLED structure, across three arrays and the underlying OLED structure in the triplet of a printhead embodiment similar to that of FIG. 2A in which the OLED structure is on a separate substrate; and, the figure illustrates the components of an actively addressable OLED structure.
Figure 6B:
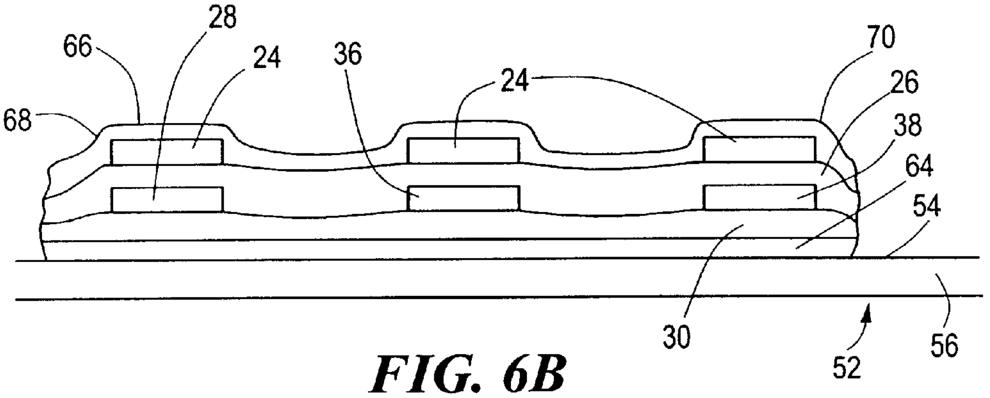
FIG. 6B is a cross-sectional view, for passively addressable OLED structure, across three arrays and the underlying OLED structure in the triplet of a printhead embodiment similar to that of FIG. 2A in which the OLED structure is on a separate substrate; and, the figure illustrates the components of a passively addressable OLED structure.
Figure 6C:
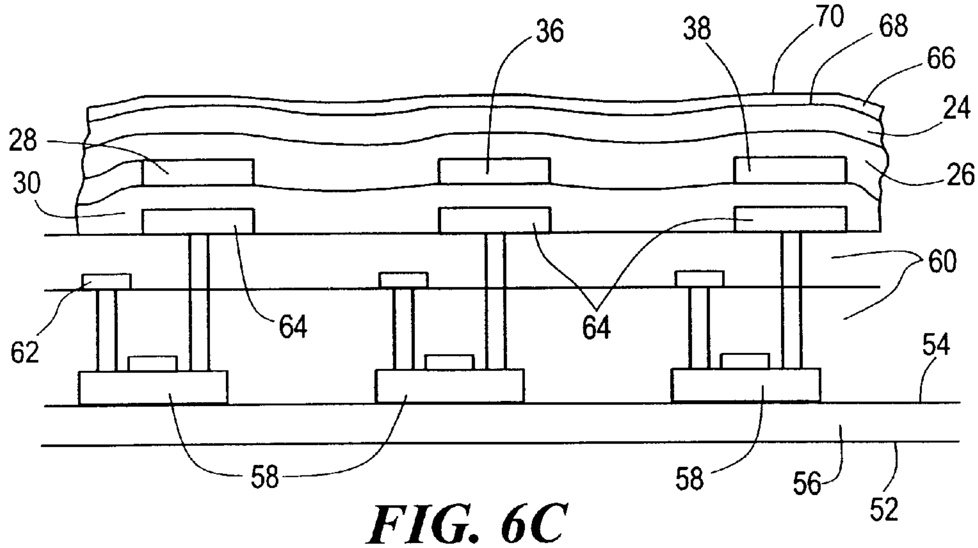
FIG. 6C is a cross-sectional view, for actively addressable OLED structure, along one array set of a printhead embodiment similar to that of FIG. 2B in which the OLED structure is on a separate substrate; and, the figure further illustrates the components of an actively addressable OLED structure.

Referring to FIGS. 6A and 6C, specific to actively addressable OLED structures, a substrate 52 serves as a base on which to deposit at least one array of actively addressable Organic Light Emitting Diode (OLED) elements. The substrate material could be glass, a plastic substrate suitable for deposition, or a semiconductor wafer. The transistor switch 58 is deposited on the first surface 54 of the substrate 52. (FET transistor switches are well known to those skilled in the art, Inuka et al. have shown a transistor switch configuration in the Sid 00 Digest, p. 924. It should be apparent to those skilled in the art how to modify that switch in order to connect the cathode to the transistor.) A planarizing layer 60 separates the transistor switch from the busses and contact pads 62 and the busses and contact pads 62 from the cathode structure 64. The planarizing layer could be constructed out of a material like silicon oxide ($SiO_2$) and the cathode structure is a conductive material structure such as a magnesium silver alloy layer and silver layer or metals such as silver, gold, aluminum, copper, magnesium or a combination thereof deposited using vacuum deposition techniques.

Figure 6D:
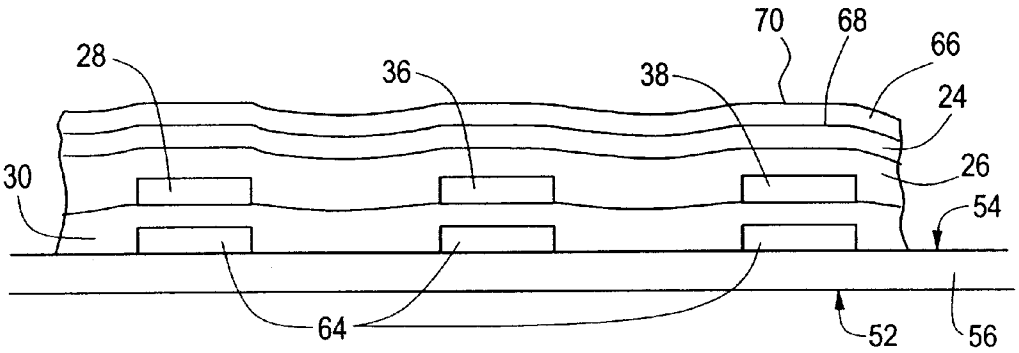
FIG. 6D is a cross-sectional view, for passively addressable OLED structure, along one array set of a printhead embodiment similar to that of FIG. 2B in which the OLED structure is on a separate substrate; and, the figure further illustrates the components of a passively addressable OLED structure.

For passively addressable OLED structures, shown in FIGS. 6C and 6D, a cathode structure 64 is deposited on the first surface 54 of the substrate. (Deposition on a substrate could also include preparing the surface, by planarizing it or passivating it, if any preparation is needed.)

Referring again to FIGS. 6A, 6B, 6C and 6D, the organic layers 26, 28 and 30 are deposited next. An electron transport layer 30, which is common to the arrays emitting at all three wavelengths is deposited. Then, an electroluminescent layer is deposited for each array (one layer 28 for the array emitting at the first wavelength range, another 36 for the array emitting at the second wavelength range, and another 38 for the array emitting at the third wavelength range). It is possible to combine the electroluminescent layer and the electron transport layer into one layer. In this case, the combined layer is different for every wavelength and layer 30 is absent. Next, a hole transport layer 26 is deposited (the hole transport layer is common to the arrays emitting in all three wavelength ranges.)

Next, a transparent conducting layer 24 which serves as an anode is deposited. The anode layer consists of a material such as indium tin oxide which is a transparent conductor, or a combination of a layer of high refractive index material, a conductive layer, and another high index layer (for example, ITO, silver or silver/gold, and ITO as described in WTO publication WO 99/36261), and is deposited by vacuum deposition techniques such as sputtering or evaporation. In order to create the row pattern, techniques well known to those skilled in the art, such as photoresist and etching techniques, are used to remove the excess material. Finally, a substantially transparent layer is deposited. This transparent layer could be acrylic or polycarbonate or transparent polymer and can be deposited by techniques such as coating or spin coating. (The term transparent or substantially transparent describes a material that has a substantial transmittance over the broad range of wavelengths of interest, that is, the range of wavelength of OLED emission or all the color filter transmission. For comparison, the typical commercial specification for transparent electrodes requires that two superposed electrodes will have a transmittance of at least 80% at 550 nm.)

FIG. 6C shows a different view of the structure for the case of actively addressable OLED elements. In that view, the busses and contact pads are explicitly shown.

The anode rows and the busses, in the case of actively addressable OLED elements, or the cathode columns, in the case of passively addressable OLED elements, can, in one embodiment, be extended beyond the OLED structure in order to constitute metallized contacts. The choice of the electrical connection means used for connecting selected ones of the individually addressable light emitting elements in the OLED structure to selected ones of the driver control circuits 46 and 48 depends on the choice of mechanical coupling means used to mechanically couple the OLED structure to the fiber optic faceplate substrate.

In one configuration, the electrical connection means for selective connection of the individually addressable light emitting elements to the driver circuits are conductive interconnecting lines. The conductive interconnecting lines are selectively deposited on the light receiving surface of the fiber optic faceplate substrate. The metallized contacts are electrically connected to respective ones of the conductive interconnecting lines by a conventional solder bumping process. The driver control circuits 46 and 48 are connected by means, such as wire bonding or solder bumping, to selected ones of the conductive interconnecting lines. Since the electrical connections to the fiber optic faceplate substrate 12 are made on the first surface of OLED substrate, the connection technique is generally referred to as the flip chip/solder bumping process. Permanently attaching the metallized contacts to selected ones of the conductive interconnecting lines by soldering (or similar methods) mechanically couples the OLED structure to the fiber optic faceplate substrate.

In another configuration the OLED structure is bonded to the fiber optic faceplate substrate using an index matched adhesive (index matched adhesives are well known in optical fabrication). In this configuration, the driver control circuits 46 and 48 for selectively controlling the energizing of the Organic Light Emitting Diode (OLED) elements are connected to the row electrodes and busses by electrical connection means such as elastomer connectors (sometimes called “zebra links”). (The driver control circuits could be mounted on the first surface of the substrate 54, or could be located elsewhere. if mounted elsewhere the connection means will also include electrical leads and connectors as is well known to those schooled in the art.)

The conductive interconnecting lines are selectively deposited on the light receiving surface of the fiber optic faceplate substrate. The metallized contacts are electrically connected to respective ones of the conductive interconnecting lines by a conventional solder bumping process. The driver control circuits 46 and 48 are connected by means, such as wire bonding or solder bumping, to selected ones of the conductive interconnecting lines. Since the electrical connections to the fiber optic faceplate substrate 12 are made on the first surface of OLED substrate, the connection technique is generally referred to as the flip chip/solder bumping process.

For the printhead embodiment similar to that of FIG. 2A but where the OLED structure is on a separate substrate (that is, where the OLED structure comprises at least one of plurality of triplets of elongated arrays of individually addressable Organic Light Emitting Diode (OLED) elements), each array in the triplet is aligned in substantially parallel spaced relation with respect to each other array in the triplet; and each triplet is aligned in substantially parallel spaced relation with respect to any other array triplet. Another printhead embodiment where the OLED structure is on a separate substrate is similar to that of FIG. 2B; that is, each array of OLED elements is comprised of a plurality of triplets of OLED elements, and each element in each triplet being capable of emitting radiation in a distinct wavelength range different from the other two elements in the same triplet (red, green, and blue for example). Exposure methods for these printheads are identical to those of the printheads of FIGS. 2A and 2B. For the printhead similar to that of FIG. 2A, the total print time, for an area exposure performed with passively addressable OLED elements, is dependent on print size and is equal to the number of rows times the sum of the exposure time for each color plus the short time to move the print engine one row, twice. In the active addressing mode, where each element has a transistor switch (two transistors and a capacitor), it is possible to energize all the OLEDs at the same time. In this case the total print time is independent of print size and, for an area exposure, is equal to three times the longest exposure time plus, again, the time to move the print engine (or the film) one row, twice.

For the printhead similar to that of FIG. 2B, for the passive addressing mode, the total print time is dependent on print size and is equal to the number of rows times the longest exposure time for any wavelength range. In the active addressing mode, the total print time is independent of print size and, for an area exposure, is equal to the longest exposure time.

Alignment between an OLED element and the individual glass fibers is not necessary since the characteristic dimension of the OLED element is much larger than the characteristic dimension of a glass fiber and, therefore, one OLED element illuminates several fibers.

Optimizing the Printhead Dimensions

In the group of embodiments of the printhead, the radiation emitted from the glass fibers of the fiber optic faceplate due to radiation originating from any OLED element in any array and impinging on the light receiving surface of the photosensitive material defines a pixel area, with a characteristic pixel dimension, on the light receiving surface of the photosensitive material. For a given distance between the planar light emitting surface of the substrate and the light receiving surface of photosensitive material, the spacing between centers of the OLED elements, and the characteristic surface dimensions of the OLED elements, and the numerical aperture (NA) of the fibers are jointly selected so that, at a given pixel area, that pixel area corresponding to a given OLED element, the exposure of the photosensitive material due to the light intensity from the elements of the given array which are adjacent to the given element, is optimized and adequate pixel sharpness is obtained. Details of an optimization procedure and an example for a film type are given below.

Optimization Procedure

Calculating the Intensity at the Pixel Area

Figure 7:
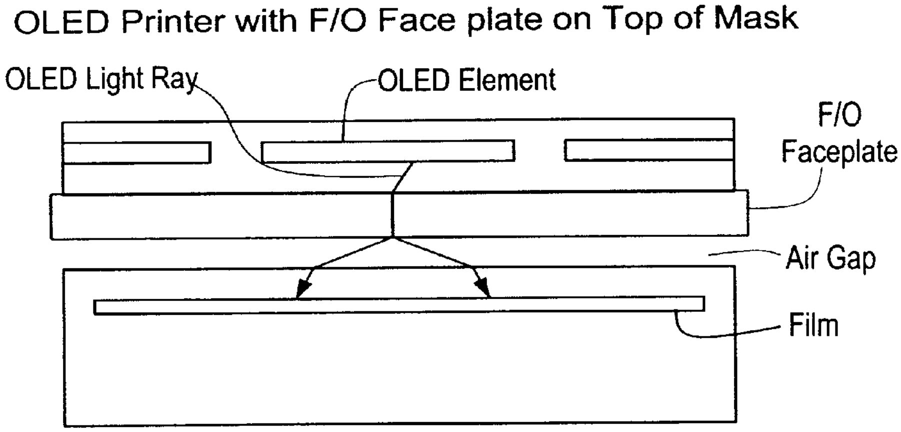
FIG. 7 illustrates the geometry used in calculating the intensity at the pixel area.
Figure 8:
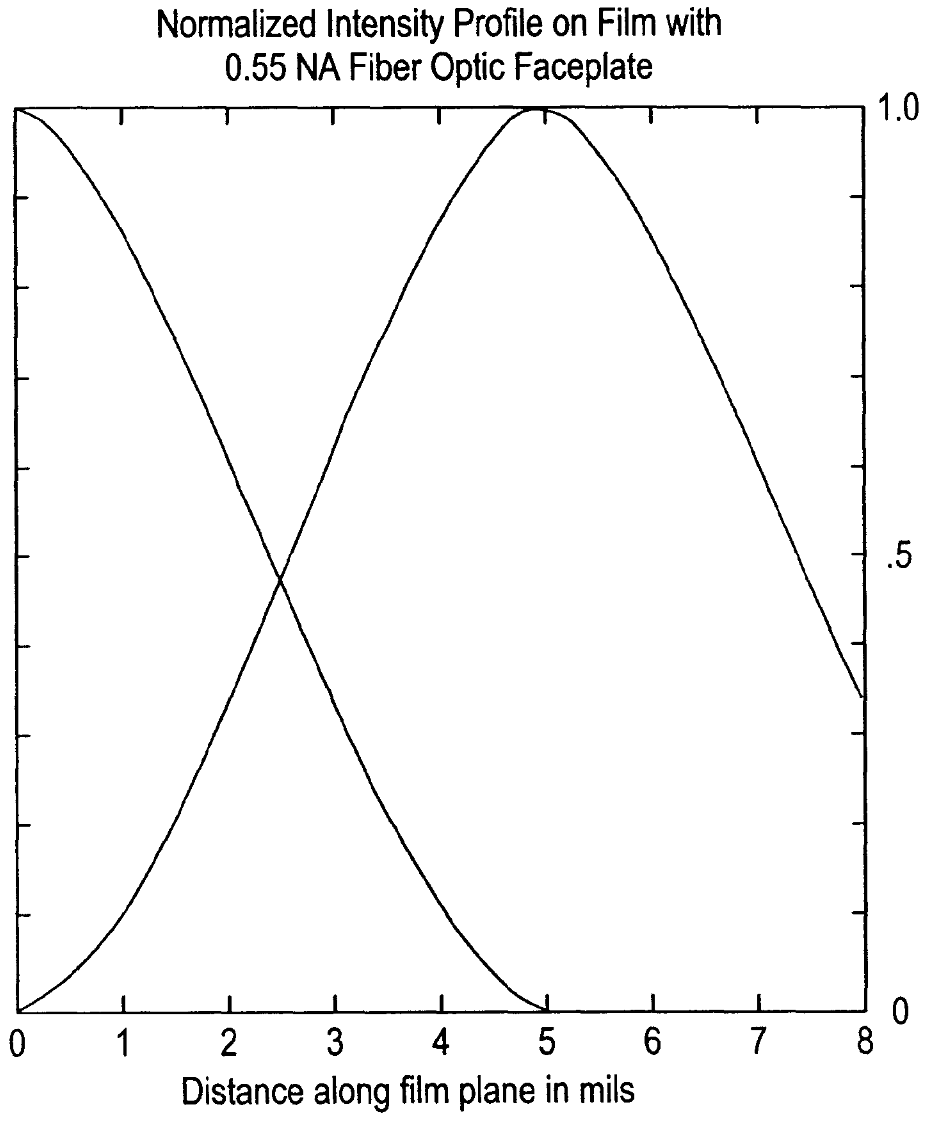
FIG. 8 shows the calculated intensity profile on the film plane from a printead with a 0.55 NA fiber optic faceplate.

In other to calculate the intensity at the pixel area, the spread of the emission from each of the OLED elements is considered to be Lambertian and the spread of the emission from the fibers in the fiber optic faceplate is determined by the numerical aperture (NA). (The intensity is defined as the power emitted per unit solid angle.) Thus, it is possible to calculate the intensity at the pixel area due to a source area taking into account the propagation of the light through the cover of the photosensitive material which has a different index of refraction, as shown in FIG. 7. (A complete and general discussion of how to calculate the propagation of the radiation from the source to the pixel can be found in Jackson, *Classical Electrodynamics,* $2^{nd}$ edition, pp. 427–432, ISBN 0-471-43132-X) Calculated intensity profiles at a given pixel are shown in FIG. 8. Calculating the pixel area requires taking into account the MTF and sensitivity of the film and the radiation intensity at the pixel location. The method and techniques are well known to those skilled in the art.

Optimization Off the Pixel Sharpness

Once the intensity profile at a given pixel, from one OLED element and for a given separation between the printhead and the photosensitive medium, is known it is possible to calculate a function of the intensity that is a measure of the pixel sharpness. The most commonly used measure of pixel sharpness is the SQF (subjective quality factor). The SQF is defined from the intensity profile produced by one OLED element element at a given pixel location at the photosensitive medium. The intensity profile produced by one OLED element at a given pixel location at the photosensitive medium is the point spread function. To compute the SQF, the point spread function is represented in the spatial frequency domain (for a review of transforms from the space domain to the spatial frequency domain, see Dainty and Shaw, *Image Science*, Chapter 6, ISBN 0-12-200850-2). The magnitude of the transform of the point spread function is the modulation transfer function, MTF(f). The SQF is defined as $$\frac{\int_{u\,min}^{u\,max} MTF(u)d(\log u)}{\int_{u\,min}^{u\,max} d(\log u)}$$

where u max and u min are the spatial frequency limits of the of the visual bandpass response.

This is the SQF as defined by Granger and Cupery (Granger, Cupery, *Phot. Sci. Eng.*, Vol. 15, pp. 221–230, 1972), who correlated the calculated SQF with acceptance ranking by observers. They found that an SQF close to 100% (or higher) obtains the highest quality ranking for sharpness. Thus, the SQF is a good measure of pixel sharpness.

Crosstalk

Crosstalk arises from the fact that emission from the spread of the emission from the fibers in the fiber optic faceplate is determined by the numerical aperture (NA), which means that some of the light emitted from any diode will expose the medium in an adjacent area. In other words, the output from any given diode will expose nearest neighbor image pixels to some extent. Some overlap is acceptable since it leads to a uniform intensity profile. The calculation of crosstalk is similar to that of pixel sharpness. That is, the intensity profile produced by adjacent OLED elements at given pixel locations at the photosensitive medium is calculated. An example is shown in FIG. 8. The intersection of the two normalized intensity lines has an absolute optimum value of 0.5. Values close to 0.5 are considered optimized designs.

Optimization Considerations for the Printheads of FIG. 2B

Figure 9:
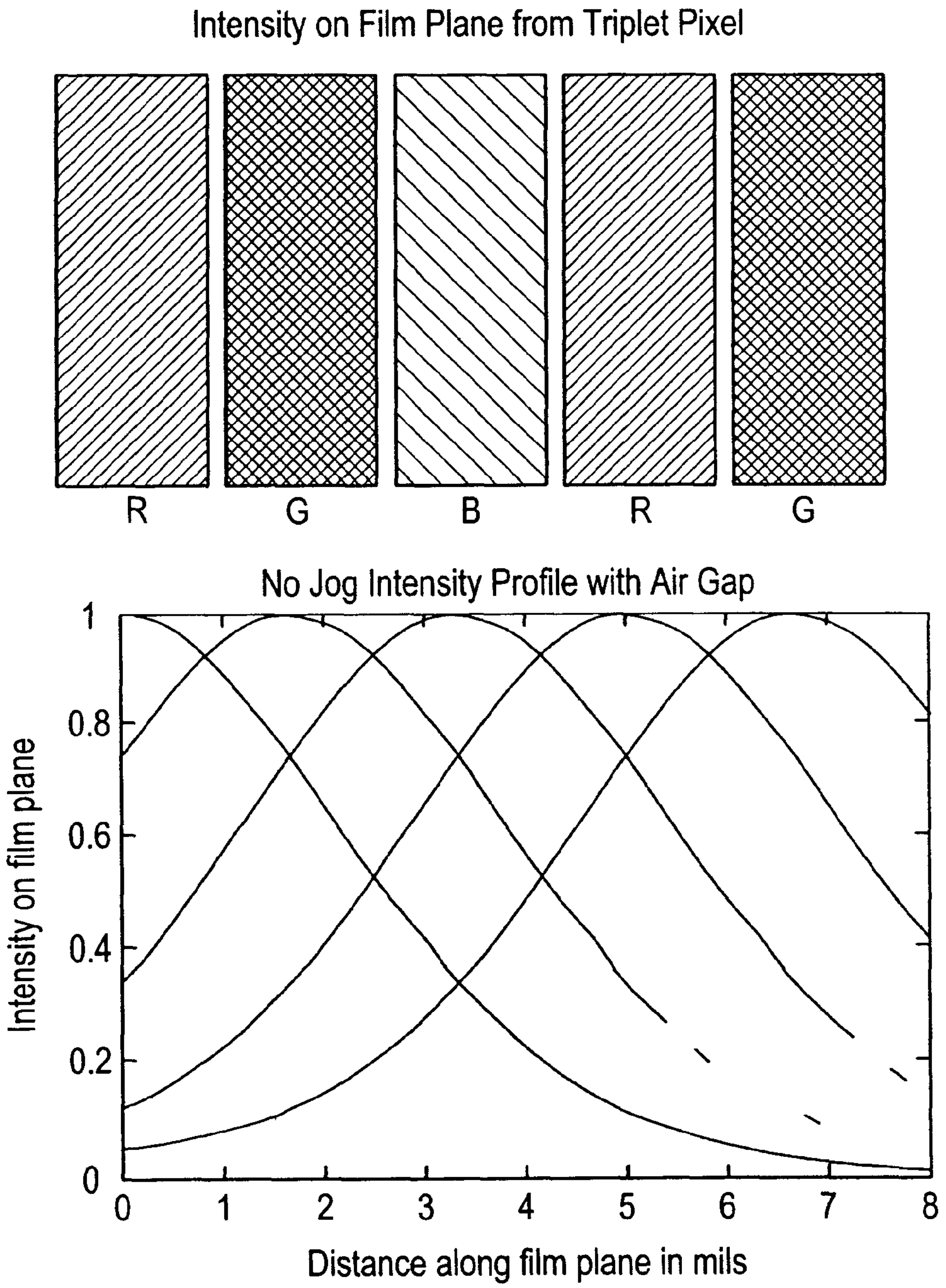
FIG. 9 illustrates the intensity profile on the film plane from a printhead of the configuration shown in FIG. 2B.

In the case where each OLED array is comprised of a plurality of triplets of OLED elements (FIG. 2B), the calculations of pixel sharpness and crosstalk proceed as above except that they are carried out for the elements emitting in the same wavelength range (for example, the elements emitting in the red, or in the green, or in the blue). One additional consideration is the overlap of intensities from different wavelength ranges. This overlap results in a slight loss in color gamut. The intensities for the three wavelength ranges of the triplet, as well as the crosstalk and the point spread function due to elements emitting in the same wavelength range, can be seen in FIG. 9.

Sample Calculations

Photosensitive Medium (Film) 1

For a Photosensitive medium (film) with the properties given in Table 1 and a printhead as shown in FIG. 2A with the parameters given in Table 2, the SQF is 97.7 and the crosstalk, shown in FIG. 8, is acceptable.

TABLE 1

Sensitivity Of Film 2.

| Sensitivity | Joules/cm$^2$ |
|---|---|
| Red, Green or Blue | $1.0 \times 10^{-8}$ |

and a printhead as shown in FIG. 2A with the parameters given in Table 4, the SQF as a function of air gap thickness is shown in the Table 3 and the crosstalk is given in FIG. 10.

TABLE 2

OLED Printer Parameters For The Case Of Film 2.

| OLED printer parameters | |
|---|---|
| DPI | 200 |
| d (Characteristic dimension of OLED = 2 * d) | 2.4 mils |
| Distance between the centers of any two OLED elements | 5.0 mils |
| Index of refraction of the OLED substrate or cover | 1.485 |

TABLE 3

Pixel SQF As A Function Of Filter Cover Thickness, Air Gap And Film Cover Thickness

| | |
|---|---|
| Filter Cover Refractive Index | 1.48 |
| Filter Cover Thickness (mils) | .5 |
| Mask (air gap) Thickness (mils) | 1.6 |
| Film Cover Sheet Thickness (mils) | 3.5 |
| SQF (pixel) | 97.7 |

Thus, embodiments have been disclosed that provide a printhead that is light weight and compact, where an OLED structure is deposited onto a fiber optic faceplate substrate or where the fiber optic faceplate substrate provides a substrate for depositing connecting conductors; and, the printhead is designed for direct printing with the desired pixel sharpness and reduced crosstalk.

Other embodiments of the invention, including combinations, additions, variations and other modifications of the disclosed embodiments will be obvious to those skilled in the art and are within the scope of the following claims.

What is claimed is:

1. An apparatus for exposing a photosensitive material, said photosensitive material having a light receiving surface and being exposed by radiation impinging on said light receiving surface, said apparatus comprising:

an elongated coherent fiber optic faceplate substrate having a substantially planar light receiving surface oppositely spaced apart with respect to a substantially planar light emitting surface, said fiber optic faceplate comprising a plurality of individual glass fibers, each of which has a given characteristic dimension; and an Organic Light Emitting Diode (OLED) structure, said structure disposed on the light receiving surface of said fiber optic faceplate substrate, and said structure comprising OLED elements, said OLED elements having characteristic dimensions which are substantially the same to each other and much larger than said given characteristic dimension of said glass fibers so that light transmitted by each of said OLED elements illuminates several glass fibers, whereby alignment between said OLED elements and individual glass fibers is not necessary.

2. The apparatus of claim 1 wherein said OLED structure comprises at least one elongated array of individually addressable Organic Light Emitting Diode (OLED) elements, said Organic Light Emitting Diode (OLED) structure being deposited onto and in effective light transmission relation to the light receiving surface of said substrate.

3. The apparatus of claim 2 further comprising:

a plurality of driver control circuits for selectively controlling the energizing of said Organic Light Emitting Diode (OLED) elements; and means of electrically connecting selected ones of said individually addressable light emitting elements in said OLED structure to said selected ones of said driver control circuits.

4. The apparatus of claim 3 wherein said at least one array is comprised of a plurality of triplets of OLED elements, and each element in each said triplet being capable of emitting radiation in a distinct wavelength range different from the other two elements in the same triplet.

5. The apparatus of claim 3 comprising at least one of plurality of triplets of said elongated arrays of individually addressable Organic Light Emitting Diode (OLED) elements, each array in the triplet being aligned in substantially parallel spaced relation with respect to each other array in the triplet, each array in each triplet being capable of emitting radiation in a distinct wavelength range different from the distinct wavelength range of the other two arrays in the triplet, each triplet being aligned in substantially parallel spaced relation with respect to any other array triplet.

6. The apparatus of any of claim 2, 4 or 5 wherein the planar light emitting surface of the substrate is oppositely spaced apart at a given distance from and substantively parallel to the light receiving surface of said photosensitive material, the Organic Light Emitting Diode (OLED) elements in any of the arrays are spaced apart by a given spacing between centers of the OLED elements, any OLED element has characteristic surface dimensions which are substantially the same for all OLED elements and from which a center point can be defined, said fiber optic faceplate comprises a plurality of solid glass fibers extending longitudinally between said light receiving surface and said light emitting surface, said fibers having a given numerical aperture, and the radiation originating from any OLED element in any said array and impinging on said light receiving surface of said photosensitive material defines a pixel area on the light receiving surface of said photosensitive material, said pixel area having a characteristic pixel dimension, said distance between the planar light emitting surface of the substrate and the light receiving surface of photosensitive material, said spacing between centers of the OLED elements, said numerical aperture, and said characteristic surface dimension of the OLED elements being jointly selected so that, at a given pixel area, said pixel area corresponding to a given OLED element in a given array, the exposure of said photosensitive material due to the light intensity from the elements of the given array which are adjacent to said given OLED element and from said given OLED element, is optimized.

7. The apparatus of claim 1 wherein said OLED structure comprises:

an OLED structure substrate having a substantially planar first surface oppositely spaced apart from and substantively parallel to a substantially planar second surface, and at least one elongated array of individually addressable Organic Light Emitting Diode (OLED) elements, said at least one array of OLED elements being disposed on said second surface of the OLED structure substrate; and a substantively transparent layer deposited onto the at least one elongated array of individually addressable Organic Light Emitting Diode (OLED) elements, said layer having a light receiving surface in effective light transmission relation to the transparent anode, said light receiving surface oppositely spaced apart from a layer light emitting surface.

8. The apparatus of claim 7 further comprising:

a plurality of driver control circuits for selectively controlling the energizing of said Organic Light Emitting Diode (OLED) elements; and means of electrically connecting selected ones of said individually addressable light emitting elements in said OLED structure to said selected ones of said driver control circuits.

9. The apparatus of claim 8 wherein said at least one array in said OLED structure is comprised of a plurality of triplets of OLED elements, each element in each said triplet being capable of emitting radiation in a distinct wavelength range different from the other two elements in the same triplet.

10. The apparatus of claim 9 wherein said OLED structure is an actively addressable OLED structure.

11. The apparatus of claim 9 wherein said OLED structure is a passively addressable OLED structure.

12. The apparatus of claim 8 wherein said OLED structure comprises at least one of plurality of triplets of said elongated arrays of individually addressable Organic Light Emitting Diode (OLED) elements, each array in the triplet being aligned in substantially parallel spaced relation with respect to each other array in the triplet, each array in each triplet being capable of emitting radiation in a distinct wavelength range different from the distinct wavelength range of the other two arrays in the triplet, each triplet being aligned in substantially parallel spaced relation with respect to any other array triplet.

13. The apparatus of claim 12 wherein said OLED structure is an actively addressable OLED structure.

14. The apparatus of claim 12 wherein said OLED structure is a passively addressable OLED structure.

15. The apparatus of any of claim 7 or 9–14 wherein the planar light emitting surface of the substrate is oppositely spaced apart at a given distance from and substantively parallel to the light receiving surface of said photosensitive material, the Organic Light Emitting Diode (OLED) elements in any of the arrays are spaced apart by a given spacing between centers of the OLED elements, any OLED element has characteristic surface dimensions which are substantially the same for all OLED elements and from which a center point can be defined, said fiber optic faceplate comprises a plurality of solid glass fibers extending longitudinally between said light receiving surface and said light emitting surface, said fibers having a given numerical aperture, and the radiation originating from any OLED element in any said array and impinging on said light receiving surface of said photosensitive material defines a pixel area on the light receiving surface of said photosensitive material, said pixel area having characteristic pixel dimensions, said distance between the planar light emitting surface of the substrate and the light receiving surface of photosensitive material, said spacing between centers of the OLED elements, said numerical aperture, and said characteristic surface dimension of the OLED elements being jointly selected so that, at a given pixel area, said pixel area corresponding to a given OLED element in a given array, the exposure of said photosensitive material due to the light intensity from the elements of the given array which are adjacent to said given OLED element and from said given OLED element, is optimized.

16. A method of producing an integral Organic Light Emitting Diode (OLED) printhead comprising the steps of:

providing an elongated coherent fiber optic faceplate substrate having a substantially planar light receiving surface oppositely spaced apart with respect to a substantially planar light emitting surface, said fiber optic faceplate comprising a plurality of individual glass fibers, each of which has a given characteristic dimension; providing an Organic Light Emitting Diode (OLED) structure, said structure comprising individually addressable OLED elements, said OLED elements having characteristic dimensions which are substantially the same as each other and much larger than said given characteristic dimension of said glass fibers; and disposing said OLED structure on the light receiving surface of said fiber optic faceplate substrate so that light transmitted by each of said OLED elements illuminates several glass fibers, whereby alignment between said OLED elements and individual glass fibers is not necessary.

17. The method of claim 16 wherein the step of disposing said OLED structure includes depositing said OLED structure on the light receiving surface of said fiber optic faceplate substrate.

18. The method of claim 16 wherein the step of disposing said OLED structure includes coupling said OLED structure to the light receiving surface of said fiber optic faceplate substrate with an index matched adhesive.

* * * * *